(12) United States Patent
Pan

(10) Patent No.: US 11,288,625 B2
(45) Date of Patent: Mar. 29, 2022

(54) WAREHOUSING MANAGEMENT METHOD AND WAREHOUSING SYSTEM

(71) Applicants: HKC Corporation Limited, Guangdong (CN); Chongqing HKC Optoelectronics Technology Co., Ltd., Chongqing (CN)

(72) Inventor: Posung Pan, Guangdong (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 398 days.

(21) Appl. No.: 16/424,504

(22) Filed: May 29, 2019

(65) Prior Publication Data

US 2020/0090112 A1    Mar. 19, 2020

Related U.S. Application Data

(63) Continuation of application No. PCT/CN2018/118922, filed on Dec. 3, 2018.

(30) Foreign Application Priority Data

Sep. 18, 2018  (CN) .......................... 201811088375.2

(51) Int. Cl.
  *G06Q 10/08*   (2012.01)
  *G05B 19/19*   (2006.01)
(52) U.S. Cl.
  CPC ........... *G06Q 10/087* (2013.01); *G05B 19/19* (2013.01)

(58) Field of Classification Search
  CPC .............................. G06Q 10/087; G05B 19/19
  See application file for complete search history.

(56) References Cited

U.S. PATENT DOCUMENTS

2015/0331410 A1* 11/2015 Saulsbury ........ G05B 19/41865
                                                              700/117

FOREIGN PATENT DOCUMENTS

| CN | 1224237 A   | 7/1999 |
|----|-------------|--------|
| CN | 1631751 A   | 6/2005 |
| CN | 101665183 A | 3/2010 |
| CN | 102502141 A | 6/2012 |

(Continued)

OTHER PUBLICATIONS

1st Office Action of counterpart Chinese Patent Application No. 201811088375.2 dated Dec. 25, 2019.

*Primary Examiner* — A. Hunter Wilder

(57) ABSTRACT

Disclosed are a warehousing management method and a warehousing system, wherein the warehousing management method includes: determining whether any of the current warehousing cabinets in the warehousing system could satisfy a balance mechanism trigger condition, wherein the warehousing system includes a plurality of warehousing cabinets, each of the warehousing cabinets includes a plurality of warehousing positions for storing the cartridges; selecting a candidate cartridge for the work in process from the current storage cabinets that does not belong to the machine on the current warehousing cabinet if the current warehousing cabinet could satisfy the balance mechanism trigger condition; controlling the transmission device to convey at least one of the candidate cartridges to the target warehousing cabinet.

11 Claims, 8 Drawing Sheets

(56) References Cited

FOREIGN PATENT DOCUMENTS

| | | |
|---|---|---|
| CN | 102826316 A | 12/2012 |
| CN | 102951401 A | 3/2013 |
| CN | 103101704 A | 5/2013 |
| CN | 203855079 U | 10/2014 |
| CN | 102826316 B | 6/2015 |
| CN | 207748384 U | 8/2018 |
| JP | H11169242 A | 6/1999 |
| JP | H11292218 A | 10/1999 |
| JP | 2004192411 A | 7/2004 |

\* cited by examiner

WAREHOUSING MANAGEMENT METHOD AND WAREHOUSING SYSTEM

CROSS REFERENCE TO RELATED APPLICATIONS

The present application is a Continuation Application of PCT Application No. PCT/CN2018/118922 filed on Dec. 3, 2018, which claims the benefit of Chinese Patent Application No. 201811088375.2, filed on Sep. 18, 2018, which is incorporated herein by reference in its entirety.

FIELD OF THE DISCLOSURE

The embodiments of the present application relate to the field of warehousing technologies, and in particular, to a warehousing management method and a warehousing system.

BACKGROUND OF THE DISCLOSURE

Warehousing is the temporary storage of products and articles during the production and circulation of products due to order lead or market forecast lead. It is a comprehensive place that reflects the activity status of the factory materials. It is a transfer station connecting production, supply and sales, and plays an important supporting role in promoting the efficiency of production.

In the panel factory, the cartridge for storing the glass substrate and the like is temporarily placed in the warehousing position of the warehousing cabinet. When the machine is producing, the cartridge is conveyed to the input port of the machine for production; after the machine has completed production, the cartridge will be conveyed to the next warehousing cabinet. Due to the limited warehousing position of the warehousing cabinet, when the number of cartridges in the warehousing cabinet is equal to that of warehousing positions, the warehousing cabinet is out of stock, and the warehousing cabinet cannot perform the conveying of the cartridge at this time. The current method is that the cartridge with the longest storage period in the warehousing cabinet is first removed from the warehousing cabinet. But the removed cartridge may be the work in process of the machine on the warehousing cabinet, so as to when it is necessary to perform production on the machine on the warehousing cabinet, the removed cartridge needs to be convey back, resulting in invalid conveying.

SUMMARY OF THE DISCLOSURE

In view of this, the purpose of the present application is to propose a warehousing management method and a warehousing system to solve the problem of the warehousing cabinet out of stock and the invalid conveying due to the balance cartridge error, and improve the conveying efficiency.

To achieve the above object, the present application adopts the following technical schemes:

in an embodiment, the present application provides a warehousing management method, including:

determining whether any of the current warehousing cabinets in the warehousing system could satisfy a balance mechanism trigger condition, among which the warehousing system includes a plurality of warehousing cabinets, each warehousing cabinets includes a plurality of warehousing positions for storing the cartridges;

selecting a candidate cartridge for the work in process from the current storage cabinets that does not belong to the machine on the current warehousing cabinet if the current warehousing cabinet could satisfy the balance mechanism trigger condition;

controlling the transmission device to convey at least one of the candidate cartridges to the target warehousing cabinet.

In another embodiment, the present application provides a warehousing system, including:

a plurality of warehousing cabinets, each of the warehousing cabinets comprising a plurality of warehousing positions for storing cartridges;

a transmission device for conveying the cartridge between the warehousing cabinets;

a control device respectively connected to the warehousing cabinet and the transmission device, for selecting, from the current warehousing cabinet, a candidate cartridge for the work in process that does not belong to the machine on the current warehousing cabinet when determining that the number of cartridges stored in any of the current warehousing cabinet in the warehousing system is greater than or equal to a set threshold N, and controlling the transmission device to convey one of the candidate cartridges having the longest storage time stored in the current warehousing cabinet to a target warehousing cabinet that could satisfy the condition for allowing the candidate cartridge to stay, among which N<n and n is the number of warehousing positions in the current warehousing cabinet.

The present application determines whether any of the current warehousing cabinets in the warehousing system could satisfy a balance mechanism trigger condition and conveys at least one candidate cartridge that could satisfy the balance mechanism trigger condition in the current warehousing cabinet that does not belong to the work in process of the machine on the current warehousing cabinet to the target warehousing cabinet through the transmission device. Therefore, by judging whether the candidate cartridge belongs to the current warehousing cabinet, the cartridge belonging to the machine of the current warehousing cabinet can be prevented from being carried out, and it is avoided to carry the removed cartridge again when the cartridge needs to be produced on the machine of the warehousing cabinet. That is, the problem of the warehousing cabinet out of stock and the invalid conveying due to the balance cartridge error, thereby improving the conveying efficiency.

Figure 1:
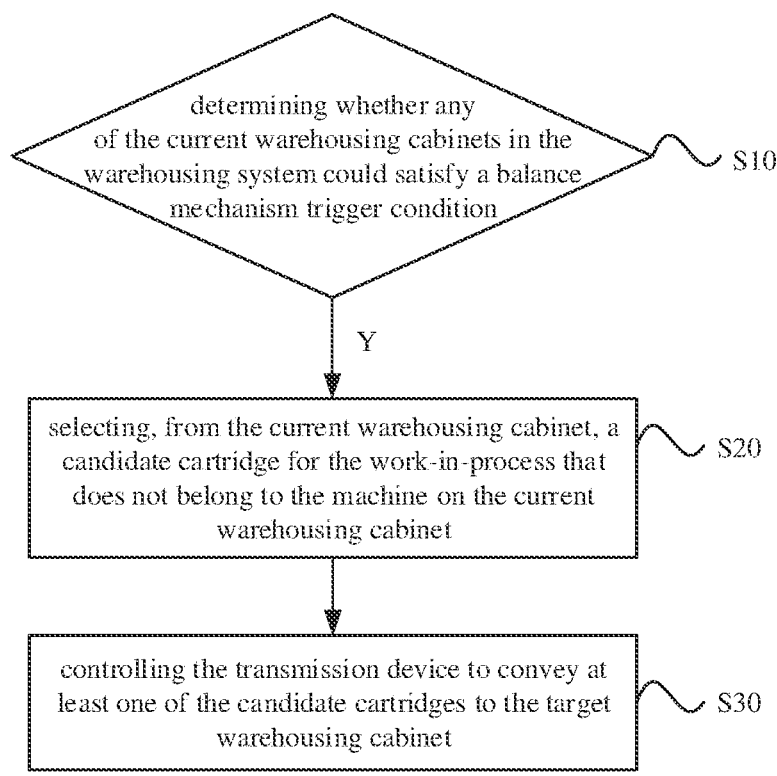
FIG. 1 is a flowchart of a warehousing management method provided by an embodiment of the present application.

The object realization, function characteristics and advantages of this application will be further described in reference to embodiments and accompanying drawings.

DETAILED DESCRIPTION OF THE EMBODIMENTS

The technical schemes of the present application will be further described below with reference to the accompanying drawings and specific embodiments. It is understood that the specific embodiments described herein are merely illustrative of the application and are not intended to be limiting. In addition, it should be noted that, for the convenience of description, only some but not all of the structures related to the present application are shown in the drawings.

FIG. 1 is a flowchart of a warehousing management method provided by an embodiment of the present application. The method is applicable to the warehousing of products during production and circulation, which can be performed by a warehousing system. As illustrated in FIG. 1, the method includes:

step S10 of determining whether any of the current warehousing cabinets in the warehousing system could satisfy the balance mechanism trigger condition.

Among which, the warehousing system includes a plurality of warehousing cabinets, each of the warehousing cabinets including a plurality of warehousing positions for storing cartridges.

Exemplarily, the warehousing system may include m warehousing cabinets, and the number of warehousing positions for storing the cartridges in each warehousing cabinet may be n1, n2, n3, . . . nm, among which m, n1, n2, n3, . . . nm are positive integers greater than 2, and the values of n1, n2, n3, . . . nm may be the same or different. The exemplary embodiment of the present application is exemplarily illustrated with the number of warehousing positions of the current warehousing cabinet being n.

Among which, step S10 may specifically include: determining whether the number of cartridges stored in any of the current warehousing cabinets in the warehousing system is greater than or equal to a set threshold N, among which N<n; the current warehousing cabinet could satisfy the balance mechanism trigger condition if the number of cartridges stored in the current warehousing cabinet is greater than or equal to the set threshold N; the current warehousing cabinet couldn't satisfy the balance mechanism trigger condition if the number of cartridges stored in the current warehousing cabinet is less than the set threshold N.

Among which, setting the threshold N to be smaller than the number of warehousing positions n of the current warehousing cabinets can increase the flexibility of the cartridge conveying to a certain extent, that is, the problem that the warehousing cabinet cannot convey the cartridge may be avoided by avoiding the out-of-stock of the warehousing cabinet.

Exemplarily, when the number n of warehousing positions of the current warehousing cabinets is 100, the set threshold N may be any positive integer less than 100 such as 99, 95, 90 or 86; when the number n of the current warehousing cabinets is 200, the set threshold N may be any positive integer less than 200 such as 199, 196, 180 or 178.

Optionally, the set threshold N is set equal to n-1. In this way, on one hand, it can prevent the out-of-stock of the warehousing, on the other hand, the warehousing position of the current warehousing cabinet can be fully utilized, and the number of conveying of the cartridges can be reduced.

Among which, if the set threshold N is smaller than the number n of the current warehousing cabinet, when the number of the cartridges stored in the warehousing cabinet is equal to N, the cartridges starts to be conveyed, which causes the number of cartridges to be conveyed more frequently; at the same time, there are no more cartridges in most of the warehousing positions, that is, there are still more unoccupied warehousing positions in the warehousing cabinet, resulting in lower utilization of the warehousing positions in the warehousing cabinet.

It should be noted that the set threshold N is set according to the number n of warehousing positions of the current warehousing cabinet as long as N<n is satisfied. The specific value of the number of warehousing positions in the current warehousing cabinet is not particularly limited in the embodiment of the present application.

Perform step S20 if the current warehousing cabinet could satisfy the balance mechanism trigger condition. That is, perform step S20 if the number of cartridges stored in the current warehousing cabinet is greater than or equal to the set threshold N.

In addition, continue to convey the cartridges to the current warehousing cabinet if the current warehousing cabinet couldn't satisfy the balance mechanism trigger condition, that is, if the number of cartridges stored in the current warehousing cabinet is less than the set threshold N. Optionally, continue to convey the cartridges to the current warehousing cabinet only if the number of cartridges stored in the current warehousing cabinet is less than the set threshold N-1, so as to avoid carrying the other cartridge out of the current warehousing cabinet if the current warehousing cabinet could satisfy the balance mechanism trigger condition after new cartridge is stored, thereby reducing the number of conveying.

Step S20 of selecting, from the current warehousing cabinet, a candidate cartridge for the work in process that does not belong to the machine on the current warehousing cabinet.

Among which, each warehousing cabinet stores a cartridge corresponding to the work in process of one or more machines correspondingly, and when a certain type of work in process is more, the cartridge can be stored in a plurality of warehousing cabinets.

Exemplarily, the work in process of the machine of the warehousing cabinet A is a glass substrate, and the work in process of the machine of the warehousing cabinet B is a color film substrate formed after coating. In the initial stage of production, the number of glass substrates is large, and the number of cartridges corresponding thereto exceeds that of warehousing positions in the warehousing cabinet A, and the number of color film substrates in the warehousing cabinet B is small. At this time, the cartridges corresponding to the glass substrate can be partially stored in a part of the warehousing cabinet B; the number of cartridges corresponding to the color film substrate in the warehousing cabinet B gradually increases as the production progresses. When the combination of the number of cartridges corresponding to the glass substrate and the number of cartridges corresponding to the color film substrate in the warehousing cabinet B exceeds a set threshold, the warehousing cabinet B could satisfy the balance mechanism trigger condition. Then, the cartridge corresponding to the glass substrate is selected from the warehousing cabinet B as the candidate cartridge to be carried out of the warehousing cabinet B. In this step, the cartridge corresponding to the color film substrate is not used as the candidate cartridge to be carried out of the warehousing cabinet B, so as to avoid moving the cartridge corresponding to the color film substrate back to the warehousing cabinet B from the other warehousing cabinet during the subsequent production, to avoid invalid conveying.

It should be noted that, in the embodiment of the present application, only two types of work in process corresponding to each of the two warehousing cabinets are exemplarily described. The specific number of warehousing cabinets and that of the work in process corresponding thereto are not particularly limited in the embodiment of the present application.

Step S30 of controlling the transmission device to convey at least one of the candidate cartridges to the target warehousing cabinet.

Among which, the target warehousing cabinet is a warehousing cabinet for storing the candidate cartridge, and the transmission device is not only used for conveying the candidate cartridge from the current warehousing cabinet to the target warehousing cabinet, but also for conveying the cartridge from the current warehousing cabinet to the machine corresponding to the work in process.

Exemplarily, the transmission device can be a conveyor belt, a conveyor car or a robot.

It should be noted that the number of the candidate cartridges to be conveyed may be one or more. The specific number of the candidate cartridges to be conveyed in the embodiment of the present application is not particularly limited.

Figure 2:
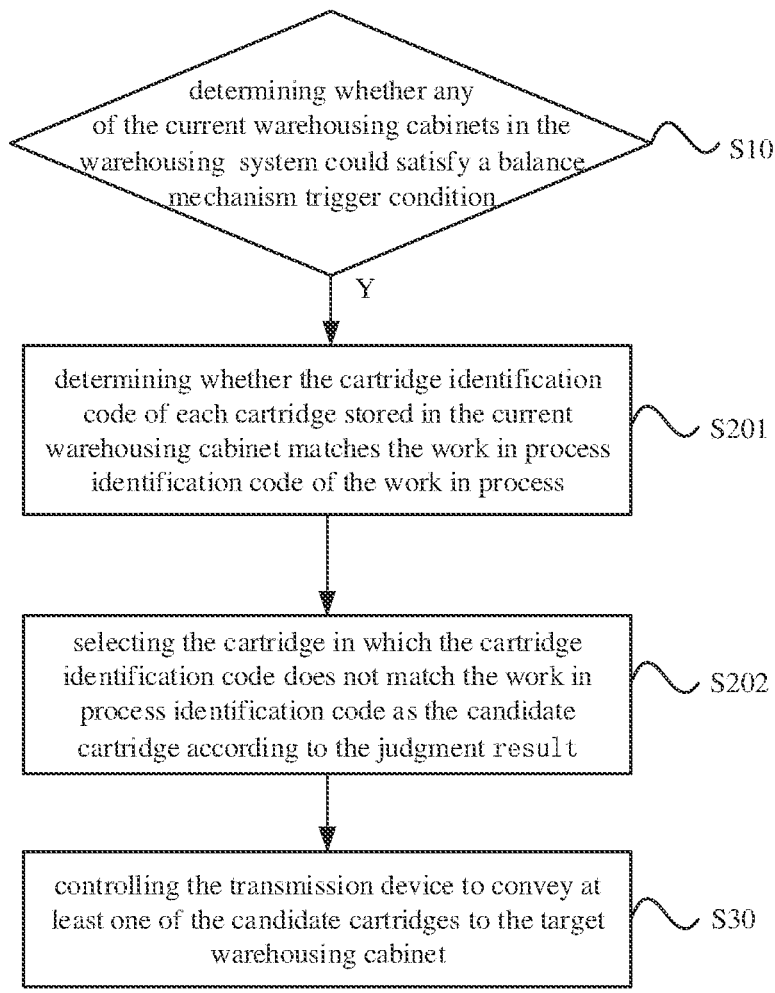
FIG. 2 is a flowchart of another warehousing management method provided by an embodiment of the present application.

FIG. 2 is a flowchart of another warehousing management method provided by the embodiment of the present application, including further refinement of step S20 in FIG. 1. As shown in FIG. 2, step S20 includes:

step S201 of determining whether the cartridge identification code of each cartridge stored in the current warehousing cabinet matches the work in process identification code of the work in process.

Among which, the cartridge identification code includes at least one of a product name, a product owner, a product site and a product grouping. The above parameters of the cassette identification code are stored in the set field, and the set field can be displayed in the user operation interface. The cartridge identification code can be obtained through the field query, and the cartridge identification code can also be set and modified.

Exemplarily, the work in process corresponding to the warehousing cabinet A is a glass substrate, and the work in process identification code includes SBS, and its work in process corresponding to the warehousing cabinet B is the color film substrate formed after being coated, and its work in process identification code includes CF; in the cartridge identification code, the cartridge identification code including the SBS matches the glass substrate identification code, and the cartridge identification code including the CF matches the color film substrate identification code. Since the work in process is arranged in one-to-one correspondence with the cartridge, there is no cartridge identification code including both the SBS and the CF in the cartridge identification code; the cartridge identification code that does not include SBS or CF does not match the glass substrate identification code and the color film substrate identification code.

It should be noted that, in the embodiment of the present application, only the glass substrate corresponding to the SBS, and the color film substrate corresponding to the CF are taken as examples. The specific coding method of the work in process identification code and the cartridge identification code is not particularly limited in the embodiment of the present application.

Step S202 of selecting the cartridge in which the cartridge identification code does not match the work in process identification code as the candidate cartridge according to the judgment result.

Among which, when the cartridge identification code matches the work in process identification code, it indicates that the work in process stored in the cartridge belongs to the work in process of the machine of the current warehousing cabinet, and in order to avoid invalid conveying, such a cartridge is not used as a candidate cartridge. When the cartridge identification code does not match the work in process identification code, it indicates that the work in process stored in the cartridge doesn't belong to the work in process of the machine of the current warehousing cabinet, and thus the cartridge can be used as the candidate cartridge to be moved out of the current warehousing cabinet.

Figure 3:
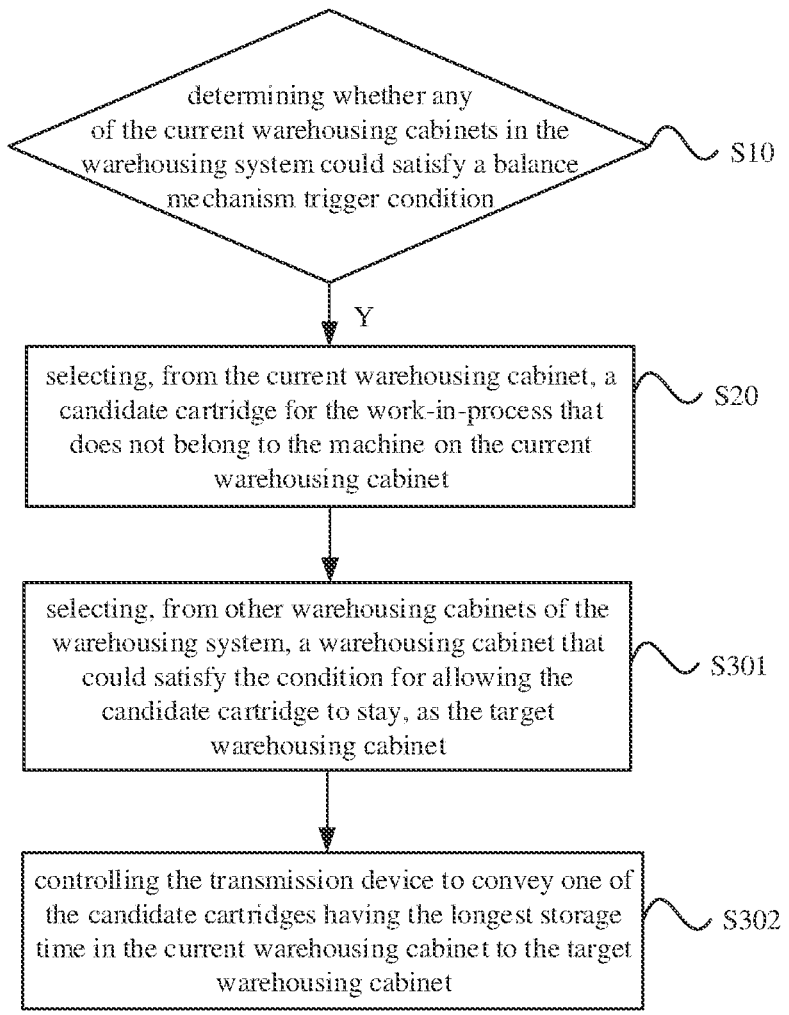
FIG. 3 is a flowchart of another warehousing management method provided by an embodiment of the present application.

FIG. 3 is a flowchart of another warehousing management method provided by the embodiment of the present application, including further refinement of step S30 in FIG. 1. As shown in FIG. 3, step S30 includes:

step S301 of selecting, from other warehousing cabinets of the warehousing system, a warehousing cabinet that could satisfy the condition for allowing the candidate cartridge to stay, as the target warehousing cabinet.

Among which, one warehousing system includes a plurality of warehousing cabinets, and when one of the warehousing cabinets could satisfy the balance mechanism trigger condition, the warehousing cabinet in the other warehousing cabinet that could not satisfy the balance mechanism trigger condition may be selected, or the warehousing cabinet of the machine corresponding to the work in process stored in the cartridge is used as the target warehousing cabinet and convey at least one candidate cartridge from the current warehousing cabinet to the target warehousing cabinet, in order to reduce the number of cartridges in the current warehousing cabinet, and ensure the normal conveying of the cartridges in the warehousing cabinet.

Step S302 of controlling the transmission device to convey one of the candidate cartridges having the longest storage time in the current warehousing cabinet to the target warehousing cabinet.

Among which, as the storage time increases, the performance of the work in process stored in the cartridges usually declines to some extent. In actual production, due to various reasons such as mass production and quality supervision, after the completion of the previous process, there may be a large amount of work in process required for the next process. In some embodiments, in this step, the principle of first-in first-out is adopted, that is, the candidate cartridge with the longest storage time is conveyed to the target warehousing cabinet, so that the work in process stored in the cartridge can be processed in the next process after the shortest interval possible, guaranteeing the quality of the finished product to a certain extent.

Figure 4:
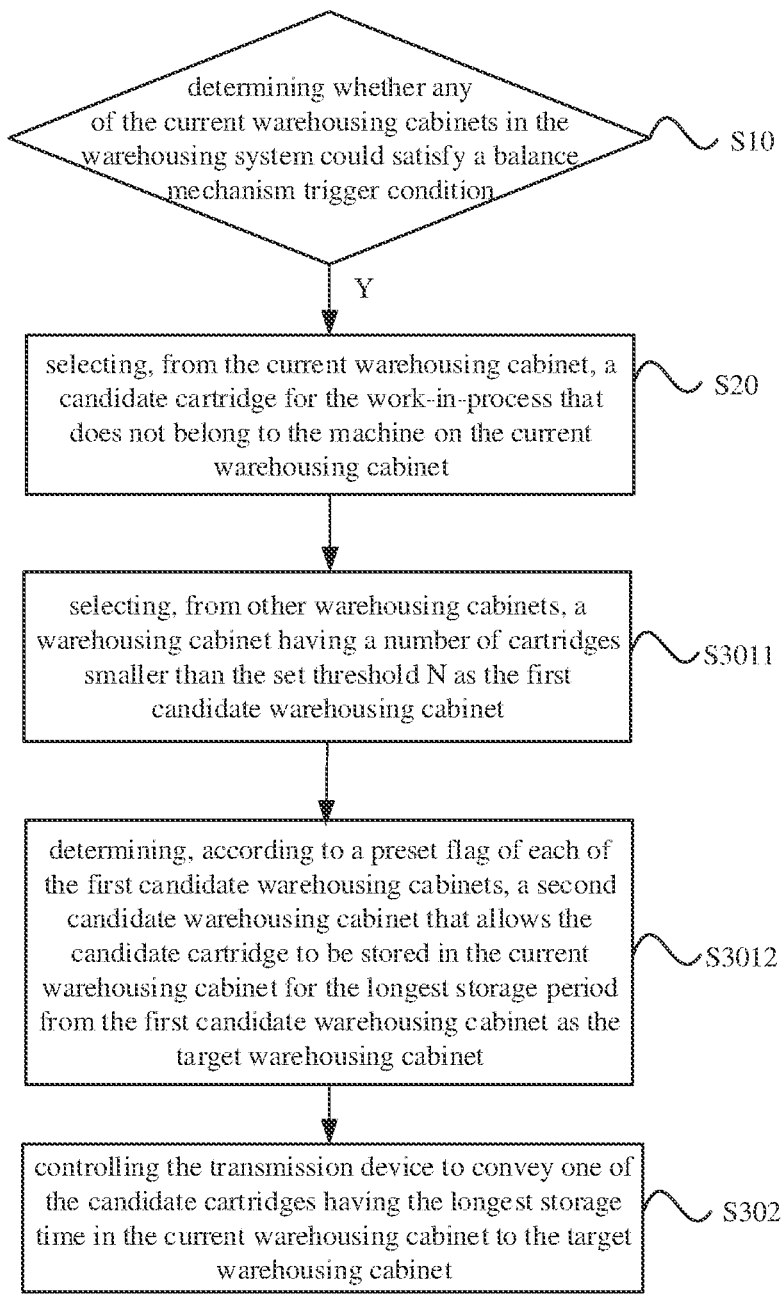
FIG. 4 is a flowchart of another warehousing management method provided by an embodiment of the present application.

FIG. 4 is a flowchart of another warehousing management method provided by another embodiment of the present application, including further refinement of step S301 in FIG. 3. As shown in FIG. 4, step S301 includes:

step S3011 of selecting, from the other warehousing cabinets, a warehousing cabinet having a number of cartridges smaller than the set threshold N as the first candidate warehousing cabinet.

Among which, the warehousing cabinet with the number of cartridges being less than the set threshold N, that is, the warehousing cabinet that could not satisfy the balance mechanism trigger condition. This type of warehousing cabinet has a large number of unoccupied warehousing positions, allowing the candidate cartridge to be moved in.

Step S3012 of determining, according to a preset flag of each of the first candidate warehousing cabinets, a second candidate warehousing cabinet that allows the candidate cartridge to be stored in the current warehousing cabinet for the longest storage period from the first candidate warehousing cabinet as the target warehousing cabinet.

Among which, the preset flag includes at least one of a product name, a product owner, a product site, a product grouping, an update user, update data, and an update time.

That is, when the number of the first warehousing cabinets is plural, the first candidate warehousing cabinet matching the cartridge identification code is selected, that is, the first candidate warehousing cabinet corresponding to the work in process stored in the cartridge is selected as the second candidate warehousing cabinet. This arrangement can prevent the moved cartridge from being moved out again when the warehousing cabinet could satisfy the balance mechanism trigger condition, thereby avoiding the secondary conveying of the candidate cartridge and improving the cartridge conveying efficiency of the warehousing system.

Figure 5:
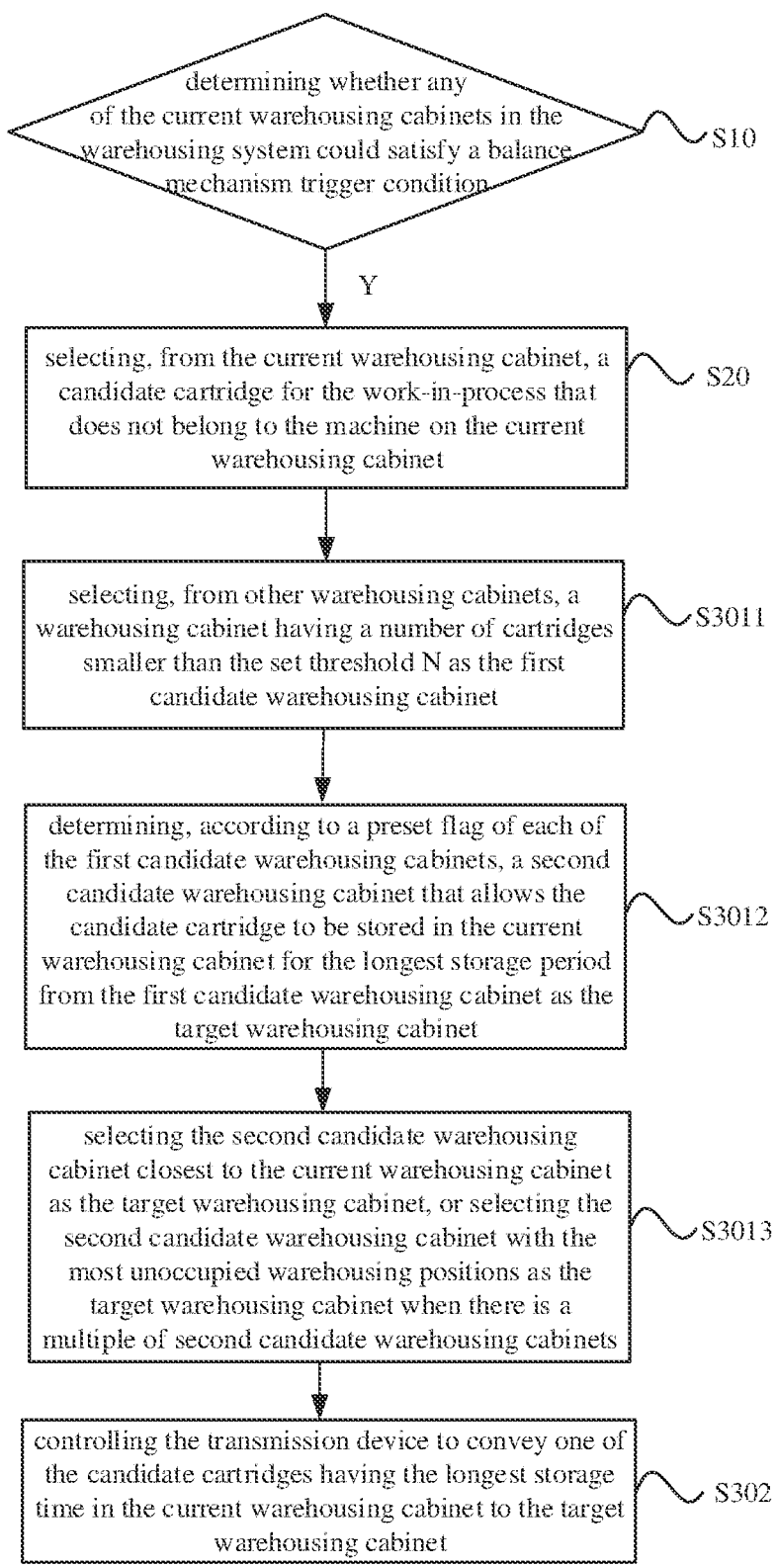
FIG. 5 is a flowchart of another warehousing management method provided by an embodiment of the present application.

FIG. 5 is a flow chart of another warehousing management method provided by the embodiment of the present application, which further includes the supplement to step S3012 in FIG. 4, and is applicable to the case where the second candidate warehousing cabinet is multiple. As shown in FIG. 5, after step S3012, the method further includes:

step S3013 of selecting the second candidate warehousing cabinet closest to the current warehousing cabinet as the target warehousing cabinet, or selecting the second candidate warehousing cabinet with the most unoccupied warehousing positions as the target warehousing cabinet when there is a multiple of second candidate warehousing cabinets.

Among which, the second candidate warehousing cabinet closest to the current warehousing cabinet is selected as the target warehousing cabinet, and the conveying time can be minimized by selecting the nearest conveying distance, thereby improving the conveying efficiency of the cartridge.

Alternatively, the second candidate warehousing cabinet with the most unoccupied warehousing positions is selected as the target warehousing cabinet. The base number of the cartridge of the target warehousing cabinet is a small, so it is necessary to carry in more cartridges to satisfy the balance mechanism trigger condition and move out the candidate cartridge. Thereby, the number of times of cartridge conveying can be reduced, and the cartridge conveying efficiency can be improved.

Figure 6:
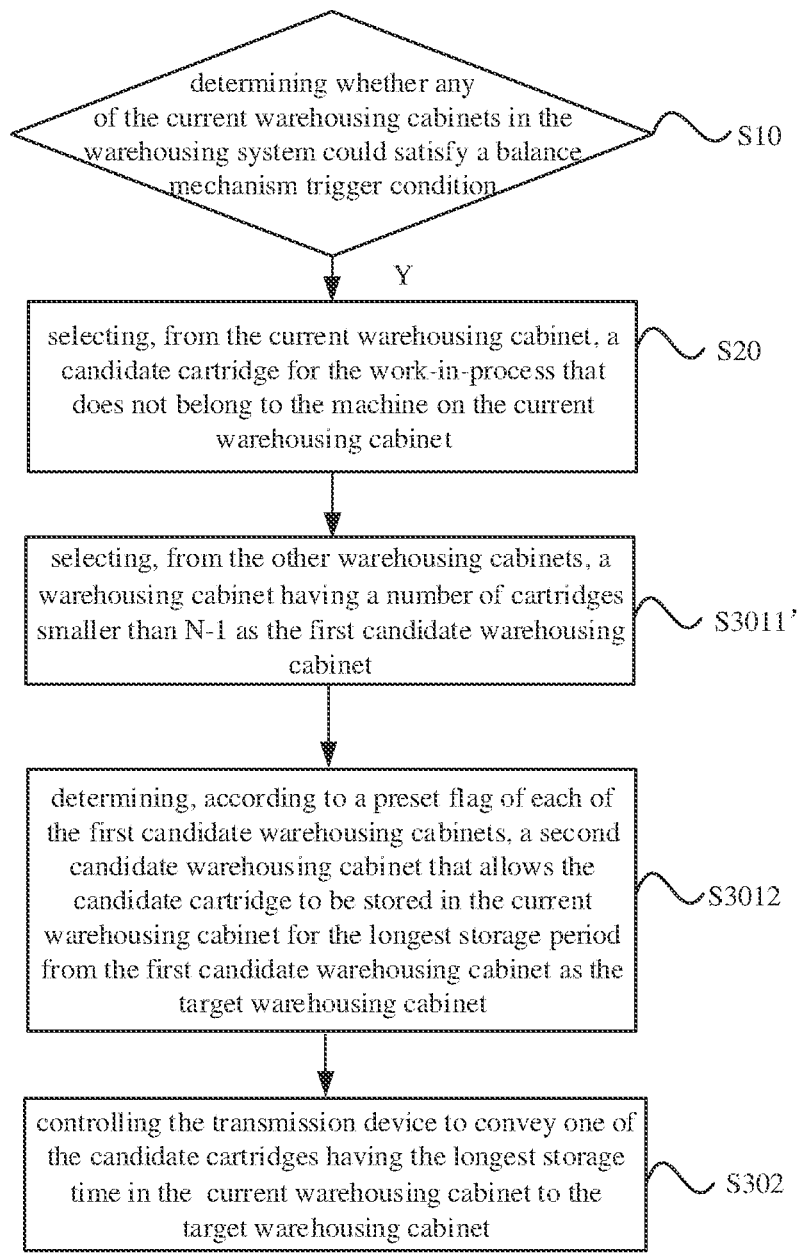
FIG. 6 is a flowchart of another warehousing management method provided by an embodiment of the present application.

FIG. 6 is a flowchart of another warehousing management method provided by another embodiment of the present application, which is a further refinement of step S301 in FIG. 3 and also a further optimization of the warehousing management method provided in FIG. 4. Referring to FIG. 6, step S301 includes:

step S3011' of selecting, from the other warehousing cabinets, a warehousing cabinet having a number of cartridges smaller than the set threshold N-1 as the first candidate warehousing cabinet.

Among which, when the number of cartridges is N, candidate cartridge conveying is required to be moved out of the current warehousing cabinet to satisfy the balance mechanism trigger condition. In this step, the number of cartridges being less than N-1 is taken as the selection criterion of the first candidate warehousing cabinet, so that multiple conveying can be avoided.

Specifically: if only the warehousing cabinet with the number of cartridges being less than N is selected as the first candidate warehousing cabinet, when the number of the cartridges of the target warehousing cabinets is N-1, only one candidate cartridge is conveyed to the target warehousing cabinet. After that, the number of cartridges stored in the target warehousing cabinet is equal to N. At this time, the target warehousing cabinet satisfies the balance mechanism trigger condition, and the cartridges need to be moved out of the target warehousing cabinet. While selecting a warehousing cabinet having a number of cartridges smaller than N-1 as the first candidate warehousing cabinet can avoid the above multiple moving in and moving out processes.

Step S3012 of determining, according to a preset flag of each of the first candidate warehousing cabinets, a second candidate warehousing cabinet that allows the candidate cartridge to be stored in the current warehousing cabinet for the longest storage period from the first candidate warehousing cabinet as the target warehousing cabinet.

Among which, the preset flag includes at least one of a product name, a product owner, a product site, a product grouping, an update user, update data, and an update time. That is, when the number of the first warehousing cabinets is plural, the first candidate warehousing cabinet matching the cartridge identification code is selected, that is, the first candidate warehousing cabinet corresponding to the work in process stored in the cartridge is selected as the second candidate warehousing cabinet. This arrangement can prevent the moved cartridge from being moved out again when the warehousing cabinet could satisfy the balance mechanism trigger condition, thereby avoiding the secondary conveying of the candidate cartridge and improving the cartridge conveying efficiency of the warehousing system.

Figure 7:
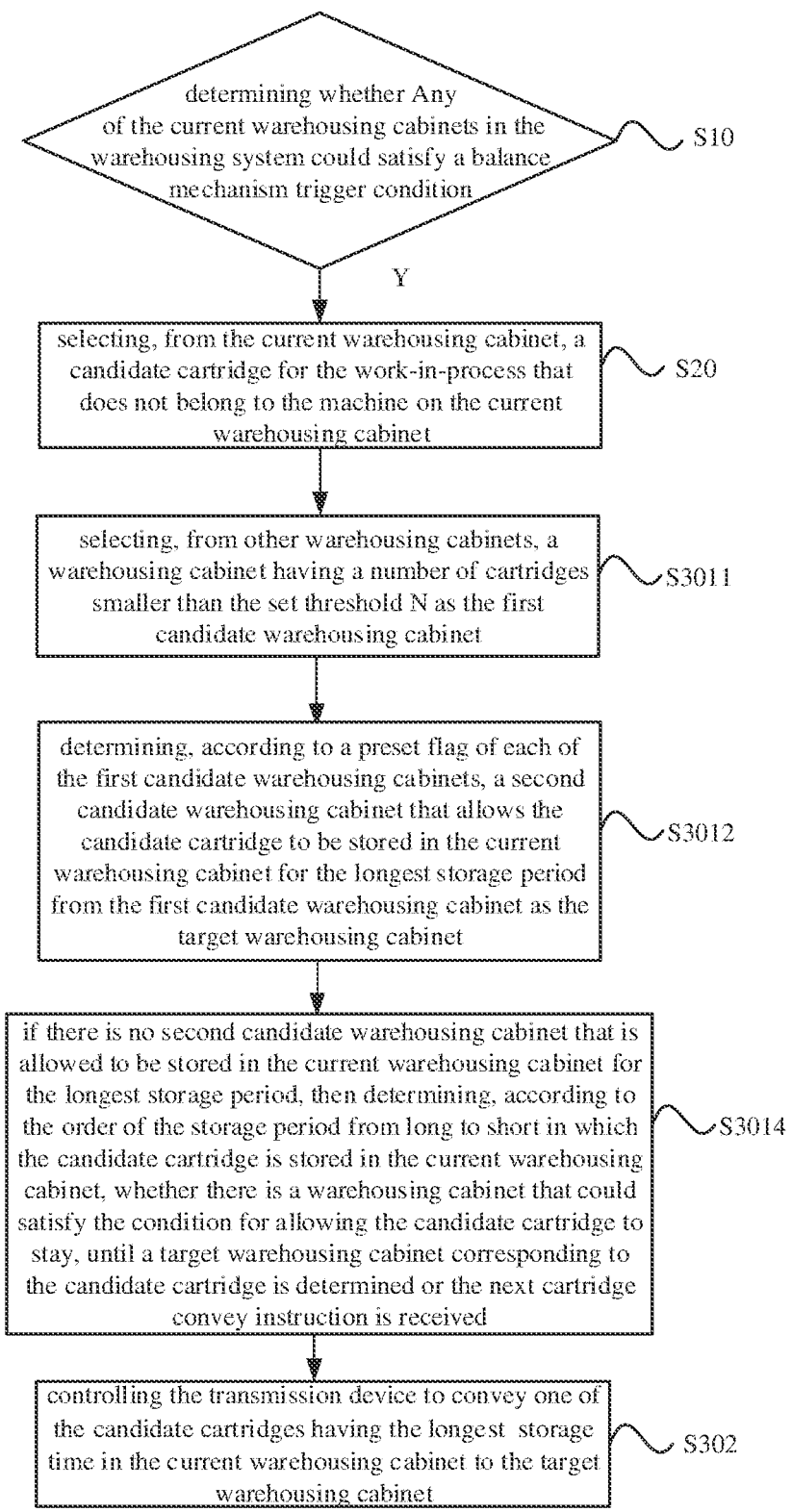
FIG. 7 is a flowchart of another warehousing management method provided by an embodiment of the present application.

FIG. 7 is a flowchart of another warehousing management method provided by an embodiment of the present application, which is a supplement to the foregoing warehousing management method, and further includes a case where there is no warehousing cabinet that satisfies the condition for allowing the candidate cartridge to stay. Referring to FIG. 7, after step S3012, further including:

step S3014 of if there is no second candidate warehousing cabinet that is allowed to be stored in the current warehousing cabinet for the longest storage period, then determining, according to the order of the storage period from long to short in which the candidate cartridge is stored in the current warehousing cabinet, whether there is a warehousing cabinet that could satisfy the condition for allowing the candidate cartridge to stay, until a target warehousing cabinet corresponding to the candidate cartridge is determined or the next cartridge convey instruction is received.

Among which, when the current warehousing cabinet satisfies the balance mechanism trigger condition, the length of the storage period of the candidate cartridge for the work in process that does not belong to the machine on the current warehousing cabinet is sorted from the long to the short, and it is determined whether there is a warehousing cabinet that satisfies the condition for allowing the candidate cartridge to stay according to the length order at this time. If there is, determine the candidate cartridge and the corresponding target warehousing cabinet; if there isn't, wait to receive the next convey command to convey the cartridge to the machine.

The management method of the present application determines whether any of the current warehousing cabinets in the warehousing system could satisfy a balance mechanism trigger condition and conveys at least one candidate cartridge that could satisfy the balance mechanism trigger condition in the current warehousing cabinet that does not belong to the work in process of the machine on the current warehousing cabinet to the target warehousing cabinet through the transmission device. Therefore, by judging whether the candidate cartridge belongs to the current warehousing cabinet, it is possible to avoid moving out the cartridge belonging to the current warehousing cabinet caused by selecting the cartridge that has been moved by the longest storage period stored in the warehousing cabinet. When it is necessary to carry out production on the machine of the warehousing cabinet, the cartridge that has been moved out will be moved back, that is, the problem of the warehousing cabinet out of stock and the invalid conveying due to the balance cartridge error is solved, thereby improving the conveying efficiency.

Figure 8:
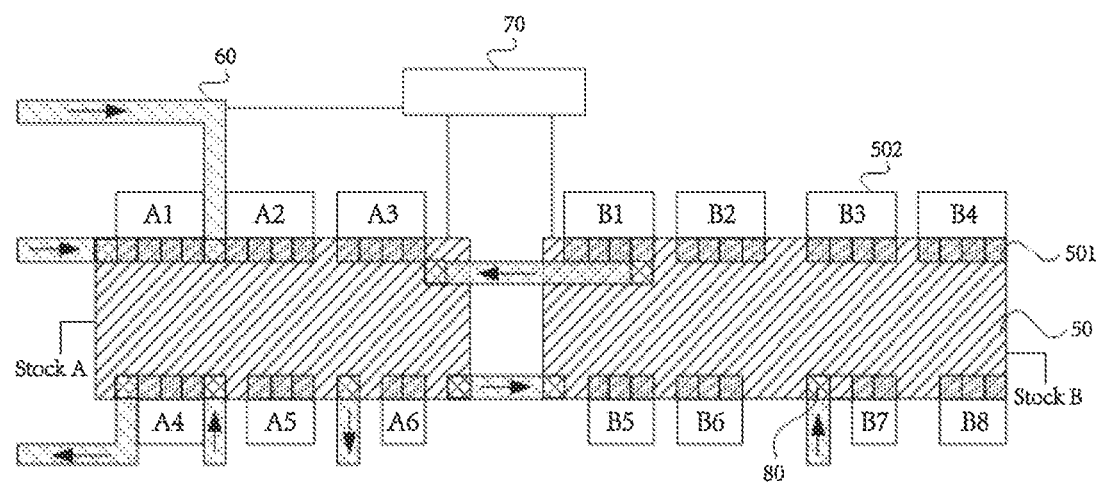
FIG. 8 is a structural block diagram of a warehousing system according to an embodiment of the present application.

FIG. 8 is a structural block diagram of a warehousing system according to another embodiment of the present application. As shown in FIG. 8, the warehousing system includes: a plurality of warehousing cabinets 50, each of which includes a plurality of warehousing positions 501 for storing cartridges 80; and a transmission device 60 for conveying cartridges between warehousing cabinets 50; a control device 70 respectively connected to the warehousing cabinet 50 and the transmission device 60, for selecting, from the current warehousing cabinet 50, a candidate cartridge 80 for the work in process that does not belong to the machine 502 on the current warehousing cabinet 50 when determining that the number of cartridges 80 stored in any of the current warehousing cabinet 50 in the warehousing system is greater than or equal to a set threshold N, and controlling the transmission device 60 to convey one of the candidate cartridges 80 having the longest storage time stored in the current warehousing cabinet 50 to a target warehousing cabinet that could satisfy the condition for allowing the candidate cartridge to stay, among which N<n and n is the number of warehousing positions in the current warehousing cabinet 50.

FIG. 8 shows only two warehousing cabinets exemplarily: the warehousing cabinet StockA and the warehousing cabinet StockB, among which the warehousing cabinet StockA corresponds to 6 machines A1, A2, A3, A4, A5 and A6, and the warehousing cabinet StockB corresponds to 8 machines B1, B2, B3, B4, B5, B6, B7, and B8, and the direction of the arrow represents the conveying direction of the cartridge. FIG. 8 is merely an illustrative illustration and is not a limitation of the warehousing system provided by the present application.

Among which, the control device 70 includes: a warehousing cabinet judgment module, a cartridge selection module, and a transmission control module.

Among which, the warehousing cabinet judgment module is configured to determine whether any of the current warehousing cabinets in the warehousing system could satisfy the balance mechanism trigger condition. Specifically, the warehousing cabinet judgment module is configured to determine whether the number of cartridges stored in any of the current warehousing cabinets in the warehousing system is greater than or equal to a set threshold N, among which N<n and n is the number of warehousing positions in the current warehousing cabinet; the current warehousing cabinet could satisfy the balance mechanism trigger condition if the number of cartridges stored in the current warehousing cabinet is greater than or equal to the set threshold N; the current warehousing cabinet couldn't satisfy the balance mechanism trigger condition if the number of cartridges stored in the current warehousing cabinet is less than the set threshold N.

Among which, a cartridge selection module is configured to select a candidate cartridge for the work in process from the current warehousing cabinets that does not belong to the machine on the current warehousing cabinet. Specifically, the cartridge selection module includes a cartridge judgment unit and a cartridge selection unit, and the cartridge judgment unit is configured to determine whether the cartridge identification code of each cartridge stored in the current warehousing cabinet matches the work in process identification code of the work in process, among which the cartridge identification code includes at least one of a product name, a product owner, a product site and a product grouping.

Among which, a transmission control module is configured to convey one of the candidate cartridges having the longest storage time in the current warehousing cabinet to the target warehousing cabinet that could satisfy the condition for allowing the candidate cartridge to stay. Specifically, the transmission control module includes a target warehousing cabinet selection unit and a candidate cartridge conveying unit, and the target warehousing cabinet selection unit is configured to select, from other warehousing cabinets of the warehousing system, a warehousing cabinet that could satisfy the condition for allowing the candidate cartridge to stay, as the target warehousing cabinet; the candidate cartridge conveying unit is configured to control the transmission device to convey one of the candidate cartridges having the longest storage time in the current warehousing cabinet to the target warehousing cabinet selected by the target warehousing cabinet selection unit.

Further, the target warehousing cabinet selection unit includes a first selection subunit and a second selection subunit, the first selection subunit is configured to select, from other warehousing cabinets, a warehousing cabinet having a number of cartridges smaller than the set threshold N as the first candidate warehousing cabinet; the second selection subunit is configured to determining, according to a preset flag of each of the first candidate warehousing cabinets, a second candidate warehousing cabinet that allows the candidate cartridge to be stored in the current warehousing cabinet for the longest storage period from the first candidate warehousing cabinet as the target warehousing cabinet; among which the preset flag includes at least one of a product name, a product owner, a product site, a product grouping, an update user, update data, and an update time.

Further, the target warehousing cabinet selection unit further includes a third selection subunit configured for the case where there is a multiple of the second candidate warehousing cabinets. Specifically, the third selection subunit is configured to select the second candidate warehousing cabinet closest to the current warehousing cabinet as the target warehousing cabinet, or select the second candidate warehousing cabinet with the most unoccupied warehousing positions as the target warehousing cabinet when there is a multiple of second candidate warehousing cabinets.

Further, the target warehousing cabinet selection unit further includes an additional selection subunit configured to sort the length of the storage period of the candidate cartridge in the current warehousing cabinet from long to short; when there is no second candidate warehousing cabinet that allows the candidate cartridge to be stored in the current warehousing cabinet for the longest storage period, the additional selection subunit is configured to change the candidate cartridge to a candidate cartridge whose storage period is the second longest in the current warehousing cabinet, and then select, by using the first selection subunit, the second selection subunit, and the third selection subunit in the target warehousing cabinet selection unit, a second candidate warehousing cabinet that allows a candidate cartridge whose storage period is the second longest to be stored in the current warehousing cabinet; and so on, until a target cartridge corresponding to a candidate cartridge is determined or a next cartridge convey instruction is received.

The warehousing system provided by the present embodiment belongs to the same application concept as the warehousing management method provided by any embodiment of the present application, and the warehousing management method provided by any embodiment of the present application can be implemented, which has corresponding functions and beneficial effects. For details of the technical details that are not described in detail in the present embodiment, refer to the warehousing management method provided in any embodiment of the present application.

Note that the above are only some illustrative embodiments of the present application and the technical principles applied thereto. A person skilled in the art will understand that the present application is not limited to the specific embodiments described herein, and that various modifications, re-adjustments, combinations and substitutions can be made by those skilled in the art without departing from the scope of the disclosure. Therefore, although the present application has been described in detail by the above embodiments, the present application is not limited to the above embodiments, and other equivalent embodiments may be included without departing from the concept of the present application. The scope of the present application is determined by the scope of the appended claims.

What is claimed is:

1. A warehousing management method, comprising:
    determining, by a control device, whether a current warehousing cabinet of a plurality of warehousing cabinets in a warehousing system could satisfy a balance mechanism trigger condition, wherein, each of the plurality of warehousing cabinets includes a plurality of warehousing positions for storing a plurality of cartridges, wherein the determining whether the current warehousing cabinet of the plurality of warehousing cabinets in the warehousing system could satisfy the balance mechanism trigger condition comprises:
        determining whether a number of the plurality of cartridges stored in the current warehousing cabinet in the warehousing system is greater than or equal to a set threshold N, wherein N<n and n is the number of warehousing positions in the current warehousing cabinet and the set threshold value N is equal to n-1;
        the current warehousing cabinet could satisfy the balance mechanism trigger condition if the number of cartridges stored in the current warehousing cabinet is greater than or equal to the set threshold N; and
        the current warehousing cabinet couldn't satisfy the balance mechanism trigger condition if the number of cartridges stored in the current warehousing cabinet is less than the set threshold N;
    selecting, by the control device, a candidate cartridge of the plurality of cartridges for a work in process from the current warehousing cabinet that does not belong to a machine on the current warehousing cabinet if the current warehousing cabinet could satisfy the balance mechanism trigger condition; and
    controlling, by the control device, a transmission device to convey the candidate cartridge to a target warehousing cabinet, wherein controlling the transmission device to convey the candidate cartridge to the target warehousing cabinet comprises:
        selecting, from other warehousing cabinets of the plurality of warehousing cabinets, a second warehousing cabinet that could satisfy the condition for allowing the candidate cartridge to stay, as the target warehousing cabinet; and
        controlling the transmission device to convey the candidate cartridge having the longest storage time in the current warehousing cabinet to the target warehousing cabinet.

2. The warehousing management method according to claim 1, wherein the selecting the candidate cartridge for the work in process from the current warehousing cabinet that does not belong to the machine on the current warehousing cabinet comprises:
    determining results based on whether the cartridge identification code of each cartridge stored in the current warehousing cabinet matches the work in process identification code of the work in process, wherein the cartridge identification code includes at least one of a product name, a product owner, and a product site and a product grouping;
    selecting the cartridge in which the cartridge identification code does not match the work in process identification code as the candidate cartridge according to the results.

3. The warehousing management method according to claim 1, wherein the selecting, from other warehousing cabinets, the second warehousing cabinet that could satisfy the condition for allowing the candidate cartridge to stay, as the target warehousing cabinet comprises:
    selecting, from the other warehousing cabinets, warehousing cabinets having a number of cartridges smaller than the set threshold N as first candidate warehousing cabinets;
    determining, according to a preset flag of each of the first candidate warehousing cabinets, a second candidate warehousing cabinet that is allowed to be stored in the current warehousing cabinet for the longest storage period from the first candidate warehousing cabinet as the target warehousing cabinet, wherein the preset flag includes at least one of a product name, a product owner, a product site, a product grouping, an update user, update data, and an update time.

4. The warehousing management method according to claim 3, further comprising:
    selecting the second candidate warehousing cabinet closest to the current warehousing cabinet as the target warehousing cabinet, or selecting the second candidate warehousing cabinet with the most unoccupied warehousing positions as the target storage bin as the target warehousing cabinet when there is a multiple of second candidate warehousing cabinets.

5. The warehousing management method according to claim 3, wherein the selecting, from the other warehousing cabinets, a warehousing cabinet having a number of cartridges smaller than the set threshold N as the first candidate warehousing cabinet comprises:

selecting, from the other warehousing cabinets, a warehousing cabinet having a number of cartridges smaller than n-1 as the first candidate warehousing cabinet.

6. The warehousing management method according to claim 3, further comprising:

if there is no second candidate warehousing cabinet that is allowed to be stored in the current warehousing cabinet for the longest storage period, then determining, according to the order of the storage period from long to short in which the candidate cartridge is stored in the current warehousing cabinet, whether there is a warehousing cabinet that could satisfy the condition for allowing the candidate cartridge to stay, until a target warehousing cabinet corresponding to the candidate cartridge is determined or the next cartridge convey instruction is received.

7. A warehousing system, comprising:

a plurality of warehousing cabinets, each of the warehousing cabinets comprising a plurality of warehousing positions for storing a plurality of cartridges;

a transmission device configured to convey the plurality of cartridges between the warehousing cabinets; and a control device respectively connected to the plurality of warehousing cabinets and the transmission device, wherein the control device is configured to:

determine whether a current warehousing cabinet of the plurality of warehousing cabinets could satisfy a balance mechanism trigger condition, wherein the determining whether the current warehousing cabinet of the plurality of warehousing cabinets in the warehousing system could satisfy the balance mechanism trigger condition comprises:

determining whether a number of the plurality of cartridges stored in the current warehousing cabinet in the warehousing system is greater than or equal to a set threshold N, wherein N<n and n is the number of warehousing positions in the current warehousing cabinet and the set threshold value N is equal to n-1;

the current warehousing cabinet could satisfy the balance mechanism trigger condition if the number of cartridges stored in the current warehousing cabinet is greater than or equal to the set threshold N; and the current warehousing cabinet couldn't satisfy the balance mechanism trigger condition if the number of cartridges stored in the current warehousing cabinet is less than the set threshold N;

select a candidate cartridge of the plurality of cartridges for a work in process from the current warehousing cabinet that does not belong to a machine on the current warehousing cabinet if the current warehousing cabinet could satisfy the balance mechanism trigger condition; and control the transmission device to convey the candidate cartridge to a target warehousing cabinet, wherein controlling the transmission device to convey the candidate cartridge to the target warehousing cabinet comprises:

selecting, from other warehousing cabinets of the plurality of warehousing cabinets, a second warehousing cabinet that could satisfy the condition for allowing the candidate cartridge to stay, as the target warehousing cabinet; and controlling the transmission device to convey the candidate cartridge having the longest storage time in the current warehousing cabinet to the target warehousing cabinet.

8. The warehousing system according to claim 7, wherein the control device comprises a cartridge judgment unit and a cartridge selection unit, and the cartridge judgment unit is configured to determine results based on whether a cartridge identification code of each cartridge stored in the current warehousing cabinet matches the work in process identification code of the work in process;

the cartridge selection unit is configured to select the cartridge in which the cartridge identification code does not match the work in process identification code as the candidate cartridge according to the results;

the cartridge identification code includes at least one of a product name, a product owner, a product site and a product grouping.

9. The warehousing system according to claim 7, wherein the control device comprises a first selection subunit and a second selection subunit;

the first selection subunit is configured to select, from other warehousing cabinets, a warehousing cabinet having a number of cartridges smaller than the set threshold N as the first candidate warehousing cabinet;

the second selection subunit is configured to determining, according to a preset flag of each of the first candidate warehousing cabinets, a second candidate warehousing cabinet that allows the candidate cartridge to be stored in the current warehousing cabinet for the longest storage period from the first candidate warehousing cabinet as the target warehousing cabinet; and the preset flag includes at least one of a product name, a product owner, a product site, a product grouping, an update user, update data, and an update time.

10. The warehousing system according to claim 9, wherein the control device further comprises a third selection subunit configured for the case where there is a multiple of the second candidate warehousing cabinets.

11. The warehousing system according to claim 10, wherein the control device further comprises an additional selection subunit configured to sort the length of the storage period of the candidate cartridge in the current warehousing cabinet from long to short;

when there is no second candidate warehousing cabinet that allows the candidate cartridge to be stored in the current warehousing cabinet for the longest storage period, the additional selection subunit is configured to change the candidate cartridge to a candidate cartridge whose storage period is the second longest in the current warehousing cabinet, and then select, by using the first selection subunit, the second selection subunit, and the third selection subunit in the control device, a second candidate warehousing cabinet that allows a candidate cartridge whose storage period is the second longest to be stored in the current warehousing cabinet; and so on, until a target cartridge corresponding to a candidate cartridge is determined or a next cartridge convey instruction is received.

* * * * *